SYSTEM FOR AUTOMATIC TELEPHONE EXCHANGES WITH CROSSBAR SWITCHES AND PRIVATE BRANCH EXCHANGE TRUNK LINES
Filed April 16, 1945
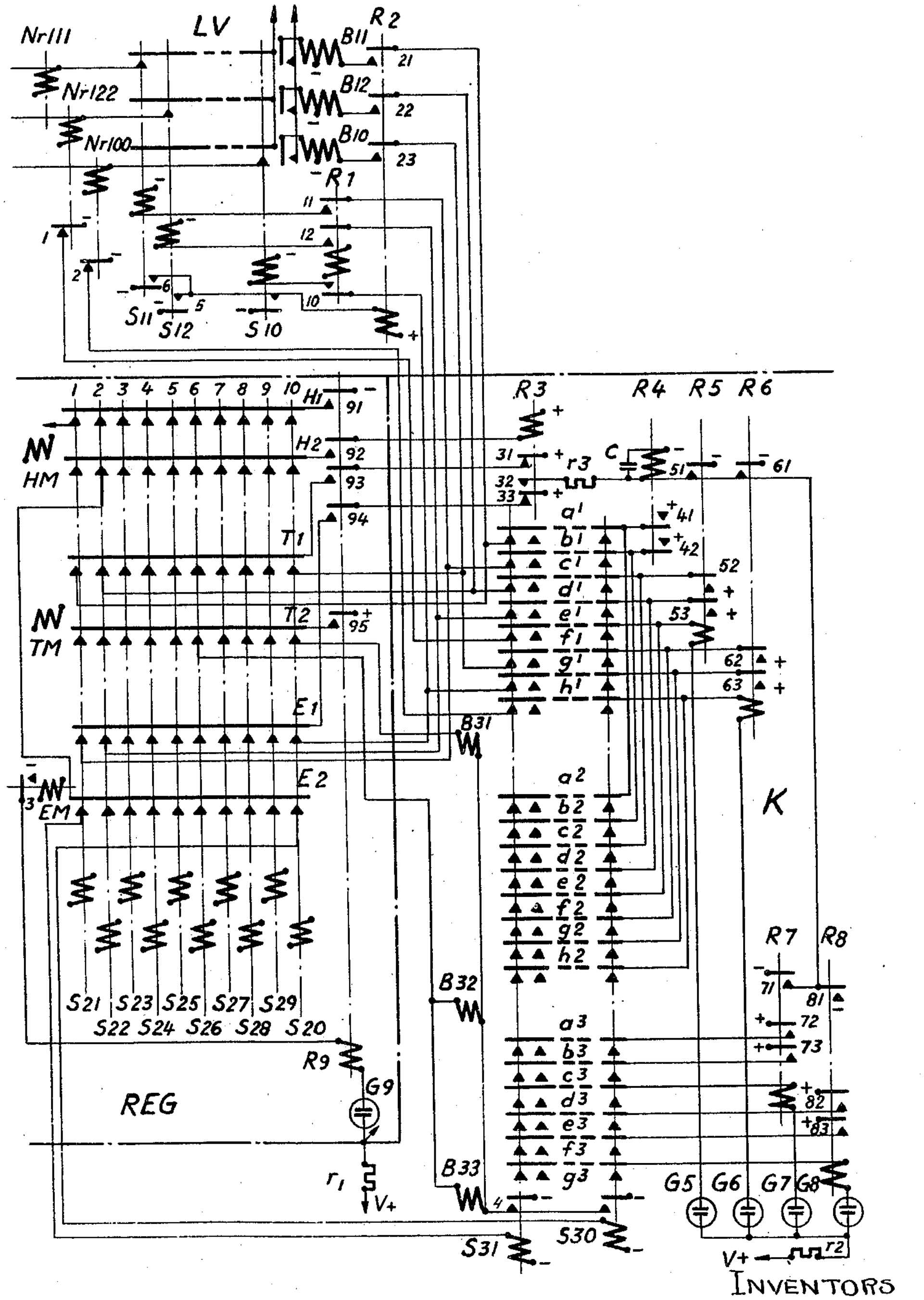
INVENTORS
N. E. NILSSON
AND K. G. JOHNSON
BY Glascock Downing & Seebold
ATTYS.

Patented Apr. 18, 1950

2,504,274

UNITED STATES PATENT OFFICE 2,504,274

SYSTEM FOR AUTOMATIC TELEPHONE EXCHANGES WITH CROSSBAR SWITCHES AND PRIVATE BRANCH EXCHANGE TRUNK LINES

Nils Emil Nilsson and Karl Georg Johnson, Stockholm, Sweden, assignors to Telefonaktiebolaget L M Ericsson, Stockholm, Sweden, a company of Sweden Application April 16, 1945, Serial No. 588,496

2 Claims. (Cl. 179—18)

In automatic telephone exchanges, so-called P. B. X connection of lines is frequent, that is, a number of lines belong to the same telephone number and calls to that number may be set up on any of said lines which is idle at the moment. In telephone exchanges with cross-bar switches it is desirable that as small a portion of a cross-bar switch is used for each switching, wherefore the cross-bar switches are often divided in minor units; this is however inconvenient from the point of view of traffic. In order to compensate the irregularity of traffic which is a result of small line groups, lines from various groups are mixed by so-called grading, frequently without consideration being taken to the numbering of the lines or their location in the selector multiple field. At P. B. X connection of lines, therefore, it should be suitable to assemble any lines whatever in a multiple field to a P. B. X group. Difficulties prevail however, at calls to a P. B. X number, against selecting an idle line within the P. B. X group.

The present invention solves this problem in a simple and satisfactory manner in register-controlled telephone systems with cross-bar switches and lines which are called by a common number by allotting to each of the lines pertaining to the common number some contacts in a contact device (for example a cross-bar switch) and when calling said lines, by using said common number, the call-receiving register is connected to said contact device, thereby setting said device in dependence of circuits which get closed when the register is set in accordance with the common number so that the contacts in the contact device pertaining to all lines corresponding to the common number are closed, circuits thereby being formed thereover for selection of one idle line and for connection of the call to said line. A consequence of this arrangement is, if the P. B. X-numbers are numerous, that all P. B. X-numbers must belong to a certain group of subscriber's numbers characterized by e. g. the first or the two first digits in the number, so that it is possible by connections in the registers to determine if a called number is a P. B. X-number or not. Further the selection of free links between the selection stages in the system is to be made with help of a marker, that for instance, points out a selected P. B. X-line and the calling line and searches a communication between these two lines. Such systems are already known and need not be described here.

Cross-bar systems are also known in which a marker upon each call to a P. B. X exchange sets a connection to a subscriber's line corresponding to the called number of the P. B. X exchange. A connector is set to said line and a relay is operated in a circuit over said connector, which relay connects all lines belonging to the called P. B. X exchange to a test device in the marker. Said test device selects a free line to the P. B. X exchange and the marker thereupon establishes a new connection, this time to the selected free line. Consequently, the marker has to set two connections for each call to a P. B. X exchange, which is a disadvantage for the reason that a marker is a relatively expensive piece of equipment, and since the number of calls to P. B. X exchanges is large, the number of markers is increased in order to handle this traffic. In the present invention, the register itself directly operates the relay that connects all of the lines belonging to the called P. B. X exchange to the test device in the marker, and the marker therefore has to establish only one connection for each call. The holding time for the marker is therefore decreased, and consequently the capacity of the marker is increased so that a smaller number of these equipments are capable of handling the traffic.

The invention will be described more in detail with reference to the accompanying drawing. LV is a line selector composed of a number of operating bars for cross-bar switches to which the lines No. 111, No. 122 and No. 100 are connected. REG is a register consisting of cross-bar switches. A contact device K common to a plurality of registers and line selectors LV is formed by relays R3—R8 and by three operating bars for cross-bar switches with the magnets B31—B33. In the register REG the selecting magnets S20—S29 are operated in known manner by the impulse train corresponding to the digits in a subscriber's number. It is assumed that the first digit in a 3-digit number is recorded by the operating magnet HM, the other by operation of the operating magnet TM and the third by operation of the operating magnet EM. When the operating magnet EM attracts its armature the digit selection is terminated, wherefore the register seeks connection with the contact device K. This is obtained by the following circuit closing: negative of exchange battery, contact 3, winding on relay R9, discharge tube G9, resistance r1 common to all the registers REG to one pole of a power supply V+, the other pole of which is connected to positive of the exchange battery. If the contact device K is idle the discharge tube G9 glows and relay R9 attracts its armature. Contacts 91—95 are closed, The resistance $r1$ is adapted in relation to the power supply V+ so that only one discharge tube G9 can glow at a time. If the subscriber number recorded in the register is a P. B. X number, the first digit is always No. 2 and the contact spring group corresponding to the selecting magnet S22 in operating bar HM is operated. The following circuit is formed when a P. B. X number has been dialled: positive, winding on relay R3, contact 92, contact strip H2 position 2, one of the contacts belonging to contact strip E2, winding on one of operating magnets S31—S30, to negative. It is assumed that the last digit in the subscriber's number is 1 and that the selecting magnet S31 and relay R3 attract their armatures; the contact 4 and 31—33 operate. Further, it is assumed that the second digit in the subscriber's number is 0 so that the contact spring groups for position 10 in operating bar TM are operated. The following circuit is formed: positive, contact 95, contact strip T2 position 10, winding on operating magnet B31, contact 4 to negative. Operating magnet B31 attracts its armature and the contacts for contact strips $a1$—$h1$ corresponding to selecting magnet S31 are closed.

Simultaneously with or before the above described switching operation, links for a communication are selected by a marker set in dependence of the called number by circuits indicated in the figure over contacts 91 and contact strip H1, but which form no part of the invention and thus do not require a more detailed description here. In the figure it is presumed that the communication is set between the calling line and a final selector LV, which can reach all P. B. X-lines and is connected to the contact device K by the relay R1. Thereby relay R1 attracts its armature and contacts 11—13 are closed. The following circuits are formed if the lines No. 122 and No. 100 are idle: negative, contact 1 and 2, respectively, contact strip $e1$ and $h1$, respectively, winding on relay R5 and R6, respectively, discharge tube G5 and G6 respectively, resistance $r2$, power supply V+, to positive. Resistance $r2$ is so adjusted in relation to power supply V+ that only one discharge tube can glow at a time. It is assumed that the discharge tube G5 glows, relay R5 attracts its armature and contacts 51—53 are closed. Following circuit is formed: positive, contact 53, contact strip $d1$, contact 12, winding on selecting magnet S12 to negative. Selecting magnet S12 attracts its armature and contact 5 is closed. The following circuit is formed: negative, contact 5, winding on relay R2, to positive. Relay R2 attracts its armature and contacts 21—23 are closed. Following circuit is formed: positive, contact 52, contact strips $c1$, contact 22, winding on operating magnet B12, to negative. Operating magnet B12 attracts its armature and is self-held over an interior circuit within the line selector LV relay equipment. Line No. 122 is connected to line selector LV. The connection between LV and register REG is broken. The register is released and restored, the contact device K thereby also being released and restored. A relay for line No. 122 attracts its armature so that contact 1 is broken and marks the line busy.

When the relay R3 according to above description attracted its armature and contacts 31—33 were closed, two circuits were interrupted: one from contact 33, over contact 94 and contact strip E1, to contact 10 and selecting magnet S10, and one from contact 31, over contact 93 and contact strip T1, to contact 23 and operating magnet B10. Said circuits are used by calls to line No. 100 with the aid of a number special to line No. 100, for example, by night connection. At the same time as contacts 31 and 33 are broken, contact 32 is closed completing the following circuit: positive, contact 32, resistance $r3$, winding on relay R4 to negative. Parallel to winding on relay R4 an electrolytic condenser C is connected, wherefore relay R4 cannot attract its armature till after a brief interval. During that time, one of the relays R5—R8 has time to attract its armature and one of the contacts 51, 61, 71 or 81 is closed, short-circuiting the winding on relay R4. Should no idle line be marked in the line group to which the call is directed, none of the relays R5—R8 will attract its armature and instead relay R4 attracts its armature. Contacts 41 and 42 are closed, completing the following circuit: positive, contact 42, contact strip $b1$, contact 11, winding on selecting magnet S11 to negative. The selecting magnet S11 attracts its armature. A circuit for relay R2 is formed over contact 6. Relay R2 attracts its armature and the contacts 21—23 are closed. The following circuit is completed: positive, contact 41, contact strip $a1$, contact 21, winding on operating magnet B11 to negative. Operating magnet B11 attracts its armature and connects line No. 111 to line selector LV. If thus all lines in a line group to which a call is directed, are busy, a predetermined line belonging to the calling line group is always connected by the contact device K to the line selector LV. At trunk calls the calling operator thus has always the possibility, with special devices, of obtaining connection with the P. B. X subscriber.

The above specification relates to a line group containing only 3 lines. For larger line groups operation of more than one operating bar in a cross-bar switch in the contact device is necessary. The figure shows how the two operating bars B32 and B33 may operate instead of operating bar B31, whereby not only relays R5 and R6 but also R7 and R8 are connected for choice of an idle line.

We claim:

1. In an automatic telephone system, a plurality of cross-bar switches, a plurality of subscribers' lines connected to said cross-bar switches, means including registers connected to said cross-bar switches for extending calls to said lines over said cross-bar switches, certain of said subscribers' lines belonging to groups each having a telephone number common to all the lines in said respective groups, an electromagnetic relay device common to all of said lines and provided with a contact set for each of said groups and a number of testing relays, means responsive to the operation of each testing relay for preventing operation of any of the other testing relays, a testing conductor and at least one marking conductor for each line belonging to one of said groups and connected over certain contacts of said electromagnetic relay device to said testing relays, means for setting said registers in accordance with a call over one of said lines, means responsive to the last-named means for connecting said registers one at a time to said electromagnetic relay device, magnets in said common electromagnetic relay device connected to the registers for operating that contact set corresponding to the telephone number registered, means including said test conductors for selecting a testing relay connected to a free line, means controlled by the operated contact set of said electromagnetic relay device for energizing the selected testing relay, and means connected to said electromagnetic relay device and including said marking conductor for operating one of said cross-bar switches to extend the call to the selected line.

2. An automatic telephone system in accordance with claim 1, in which said common electromagnetic relay device includes a timing relay, connections between one of said registers and said timing relay for energizing the latter when said register is connected to said common electromagnetic contact device, and means including a marking conductor connected to a contact in the contact set for each group and to a contact of said timing relay, for operating one of said cross-bar switches to extend a call to a predetermined line of a group when all other lines in said group are busy.

NILS EMIL NILSSON.
KARL GEORG JOHNSON.

REFERENCES CITED

The following references are of record in the file of this patent:

UNITED STATES PATENTS

| Number | Name | Date |
|---|---|---|
| 1,568,306 | Williams | Jan. 5, 1926 |
| 2,201,573 | Carpenter | May 21, 1940 |